United States Patent
Eliaz et al.

(10) Patent No.: US 7,613,260 B2
(45) Date of Patent: *Nov. 3, 2009

(54) MODEM CONTROL USING CROSS-POLARIZATION INTERFERENCE ESTIMATION

(75) Inventors: Amir Eliaz, Moshav Ben-Shemen (IL); Avi Turgeman, Modi'in (IL); Ahikam Aharony, Tel Mond (IL); Jonathan Friedmann, Tel Aviv (IL)

(73) Assignee: Provigent Ltd, Herzliya (IL)

( * ) Notice: Subject to any disclaimer, the term of this patent is extended or adjusted under 35 U.S.C. 154(b) by 488 days.

This patent is subject to a terminal disclaimer.

(21) Appl. No.: 11/285,414

(22) Filed: Nov. 21, 2005

(65) Prior Publication Data

US 2007/0116162 A1    May 24, 2007

(51) Int. Cl.
  *H04B 1/10* (2006.01)
(52) U.S. Cl. .................. 375/349; 375/350
(58) Field of Classification Search .......... 375/349, 375/348, 350, 346, 326
See application file for complete search history.

(56) References Cited

U.S. PATENT DOCUMENTS

| | | | |
|---|---|---|---|
| 4,310,813 A | 1/1982 | Yuuki et al. |
| 4,321,705 A | 3/1982 | Namiki |
| 4,367,555 A | 1/1983 | Namiki et al. |
| 4,438,530 A | 3/1984 | Steinberger |
| 4,479,258 A | 10/1984 | Namiki |
| 4,575,862 A | 3/1986 | Tahara et al. |
| 4,577,330 A | 3/1986 | Kevehard |
| 4,606,054 A | 8/1986 | Amitay et al. |
| 4,631,734 A | 12/1986 | Foschini |
| 4,644,562 A | 2/1987 | Kevehard et al. |
| 4,688,235 A | 8/1987 | Tahara et al. |
| 4,761,784 A | 8/1988 | Srinivasagopalan et al. |
| 4,857,858 A | 8/1989 | Tahara |

(Continued)

FOREIGN PATENT DOCUMENTS

EP    1365519    11/2003

(Continued)

OTHER PUBLICATIONS

Gagnon, et al., "A Simple and Fast Carrier Recovery Algorithm for High-Order QAM", IEEE Communications Letters, (9:10), Oct. 2005, pp. 918-920.

(Continued)

*Primary Examiner*—Emmanuel Bayard
(74) *Attorney, Agent, or Firm*—D. Kligler I.P. Services Ltd.

(57) ABSTRACT

A receiver includes an input circuit, which is coupled to at least one antenna so as to receive, process and digitize first and second signals, thus generating first and second streams of input samples. An interference cancellation circuit in the receiver includes first and second adaptive filters, which are respectively coupled to filter the first and second streams of input samples using respective first and second coefficients to generate respective first and second filter outputs. A phase rotator is adapted to apply a variable phase shift compensating for a phase deviation between the first and second signals, the phase rotator having at least one configuration parameter. A control module is operative to estimate signal characteristics of the interference cancellation circuit and to set the at least one configuration parameter of the phase rotator responsively to the estimated signal characteristics.

47 Claims, 5 Drawing Sheets

U.S. PATENT DOCUMENTS

| | | | |
|---|---|---|---|
| 4,910,468 A | 3/1990 | Ohtsuka et al. | |
| 4,914,676 A | 4/1990 | Iwamatsu et al. | |
| 4,992,798 A | 2/1991 | Nozue et al. | |
| 5,023,620 A | 6/1991 | Matsuura | |
| 5,068,667 A | 11/1991 | Mizoguchi | |
| 5,075,697 A | 12/1991 | Koizumi et al. | |
| 5,241,320 A | 8/1993 | Mizoguchi et al. | |
| 5,247,541 A | 9/1993 | Nakai et al. | |
| 5,311,545 A * | 5/1994 | Critchlow | 375/232 |
| 5,311,546 A | 5/1994 | Paik et al. | |
| 5,383,224 A | 1/1995 | Mizoguchi | |
| 5,406,589 A | 4/1995 | Iwamatsu et al. | |
| 5,432,522 A | 7/1995 | Kyrokami | |
| 5,471,508 A * | 11/1995 | Koslov | 375/344 |
| 5,495,502 A | 2/1996 | Andersen | |
| 5,524,027 A | 6/1996 | Huisken | |
| 5,541,951 A | 7/1996 | Juhasz et al. | |
| 5,541,955 A | 7/1996 | Jacobsmeyer | |
| 5,631,896 A | 5/1997 | Kawase et al. | |
| 5,710,799 A | 1/1998 | Kobayashi | |
| 5,727,032 A | 3/1998 | Jamal et al. | |
| 5,742,646 A | 4/1998 | Woolley et al. | |
| 5,809,070 A | 9/1998 | Krishnan et al. | |
| 5,838,740 A | 11/1998 | Kallman et al. | |
| 5,844,950 A | 12/1998 | Aono et al. | |
| 5,901,343 A | 5/1999 | Lange | |
| 5,905,574 A | 5/1999 | Vollbrecht et al. | |
| 5,920,595 A | 7/1999 | Iwamatsu | |
| 5,940,453 A | 8/1999 | Golden | |
| 5,987,060 A | 11/1999 | Grenon et al. | |
| 6,215,827 B1 | 4/2001 | Balachandran et al. | |
| 6,236,263 B1 | 5/2001 | Iwamatsu | |
| 6,252,912 B1 | 6/2001 | Salinger | |
| 6,418,164 B1 | 7/2002 | Endres et al. | |
| 6,466,562 B1 | 10/2002 | Yoshida et al. | |
| 6,501,953 B1 | 12/2002 | Braun et al. | |
| 6,611,942 B1 | 8/2003 | Battistello et al. | |
| 6,628,707 B2 | 9/2003 | Ratie et al. | |
| 6,647,059 B1 | 11/2003 | Faruque | |
| 6,665,810 B1 | 12/2003 | Sakai | |
| 6,826,238 B2 | 11/2004 | Ahn et al. | |
| 6,829,298 B1 | 12/2004 | Abe et al. | |
| 6,836,515 B1 | 12/2004 | Kay et al. | |
| 6,888,794 B1 | 5/2005 | Jovanovic et al. | |
| 6,920,189 B1 | 7/2005 | Spalink et al. | |
| 7,003,042 B2 | 2/2006 | Morelos-Zaragoza et al. | |
| 7,016,296 B2 | 3/2006 | Hartman | |
| 7,046,753 B2 * | 5/2006 | Resheff et al. | 375/350 |
| 7,047,029 B1 | 5/2006 | Godwin et al. | |
| 7,133,425 B2 | 11/2006 | McClellan | |
| 7,133,441 B1 | 11/2006 | Barlev et al. | |
| 7,187,719 B2 | 3/2007 | Zhang | |
| 7,333,556 B2 | 2/2008 | Maltsev et al. | |
| 2002/0016933 A1 | 2/2002 | Smith et al. | |
| 2002/0051498 A1 | 5/2002 | Thomas et al. | |
| 2002/0061752 A1 | 5/2002 | Kurokami | |
| 2002/0122511 A1* | 9/2002 | Kwentus et al. | 375/343 |
| 2002/0181490 A1 | 12/2002 | Frannhagen et al. | |
| 2003/0021370 A1* | 1/2003 | Menkhoff | 375/355 |
| 2003/0043778 A1 | 3/2003 | Luschi et al. | |
| 2003/0066082 A1 | 4/2003 | Kliger et al. | |
| 2003/0135532 A1 | 7/2003 | Peting | |
| 2004/0017860 A1 | 1/2004 | Liu | |
| 2004/0063416 A1 | 4/2004 | Kuenen et al. | |
| 2004/0086668 A1 | 5/2004 | Dronzek et al. | |
| 2004/0127179 A1 | 7/2004 | Sasaki | |
| 2004/0146122 A1* | 7/2004 | Fague et al. | 375/326 |
| 2004/0151108 A1 | 8/2004 | Blascoet al. | |
| 2005/0002474 A1* | 1/2005 | Limberg | 375/321 |
| 2005/0010853 A1 | 1/2005 | Duvant et al. | |
| 2005/0063496 A1 | 3/2005 | Guillouard et al. | |
| 2005/0075078 A1 | 4/2005 | Makinen et al. | |
| 2005/0169401 A1 | 8/2005 | Abraham et al. | |
| 2005/0190868 A1 | 9/2005 | Khandekar et al. | |
| 2005/0239398 A1 | 10/2005 | Lai | |
| 2005/0265436 A1 | 12/2005 | Suh et al. | |
| 2006/0008018 A1* | 1/2006 | Kolze | 375/260 |
| 2006/0013181 A1 | 1/2006 | Stolpman et al. | |
| 2006/0107179 A1 | 5/2006 | Shen et al. | |
| 2006/0203943 A1 | 9/2006 | Scheim et al. | |
| 2006/0209939 A1 | 9/2006 | Mantha | |
| 2007/0116143 A1 | 5/2007 | Bierke et al. | |
| 2007/0153726 A1 | 7/2007 | Bar-Sade et al. | |
| 2007/0230641 A1 | 10/2007 | Yehudai | |
| 2008/0002581 A1 | 1/2008 | Gorsetman et al. | |
| 2008/0008257 A1 | 1/2008 | Yonesi et al. | |
| 2008/0043829 A1 | 2/2008 | Shiue et al. | |
| 2008/0130726 A1 | 6/2008 | Sofer et al. | |
| 2008/0155373 A1 | 6/2008 | Friedman et al. | |
| 2008/0254749 A1 | 10/2008 | Ashkenazi et al. | |
| 2008/0259901 A1 | 10/2008 | Friedman et al. | |
| 2009/0049361 A1 | 2/2009 | Koren et al. | |
| 2009/0092208 A1 | 4/2009 | Montekyo et al. | |

FOREIGN PATENT DOCUMENTS

| | | |
|---|---|---|
| JP | 06-021762 | 1/1994 |
| JP | 09-064791 | 3/1997 |
| WO | 0060802 A1 | 10/2000 |
| WO | 0076114 A1 | 12/2000 |
| WO | WO-00/77952 A1 | 12/2000 |
| WO | 2004086668 A1 | 10/2004 |
| WO | 2006097735 A2 | 9/2006 |
| WO | 2006118892 A1 | 11/2006 |
| WO | 2007040906 A2 | 4/2007 |

OTHER PUBLICATIONS

C. Richard Johnson, Jr., et al., "Blind Equalization Using the Constant Modulus Criterion: A review", Proceedings of the IEEE, vol. 86, No. 10, Oct. 1998.

Best, "Phase Locked Loops: Design, Simulation, And Applications", McGraw Hill, Fifth Edition, Jun. 2003.

Kim aznd Choi, "Design of Carrier Recovery Algorithm for High-Order QAM with Large Frequency Acquisition Range", IEEE International Conference on Communication (ICC), Helsinki, Finland, Jun. 11-14, 2001, vol. 4 pp. 1016-1020.

Benany and Gagnon, "Comparison of Carrier Recovery Techniques in M-QAM Digital Communications Systems" 13th Annual Canadian Conference on Electrical and Computer Engineering, Mar. 7-10, 2000, Halifax, Nova Scotia, pp. 73-77.

American National Standard T1.105-2001, "Synchronous optical network (SONET)—basic description including multiplex structure, rates and format", Alliance for Telecommunications Industry Solutions, 2001.

Calderbank A., "Multilevel Codes and Multistage Decoding", IEEE Transactions on Communications, vol. 37, No. 3 Mar. 1989.

Colavolpe et al., "Algorithms for iterative decoding in the presence of strong phase noise", IEEE Journal on Selected Areas in Communications, vol. 23, No. 9, pp. 1748-1757, Sep. 2005.

Goeckel D., "Adaptive Coding for Time-Varying Channels Using Outdated Fading Estimates", IEEE Transactions on Communications, vol. 47, No. 6, Jun. 1999.

Dr. Lin-Nan Lee, "LDPC Codes, Application to Next Generation Communication Systems", Hughes Network System Oct. 8, 2003.

Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.

ITU Recommendation G.703, "General Aspects of Digital Transmission Systems-Terminal Equipments-Physical/Electrical Characteristics of Hierarchical Digital Interfaces", Geneva, Switzerland 1991.

ITU Recommendation G.704, "Series G: Transmission Systems and Media, Digital Systems and Networks, Digital Transmission Systems-Terminal Equipments-General, Synchronous Frame Structures used at 1544, 6312, 2048, 8448 and 44736 kbit/s hierarchical levels", Oct. 1998.

Gallager R., "Low-Density Parity-Check Codes", IRE Transactions on Information Theory, vol. 7, pp. 21-28, Jan. 1962.

GR-253-CORE by Telcordia Technologies, "Synchronous optical network (SONET) transport systems: common criteria" Issue 3, Sep. 2000.

Hassan K., "LPDC encoded pilots for iterative receiver improvement", Thesis submiteed to the College Engineering of Wichita State University, Dec. 2005.

Ericsson AB, "Capacity without ties; Mini-Link microwave transmission solution", EN/LZT 712 0117 R2, Molndal, Sweden, 2005.

Hu et al., "Adaptive Modulation Using Long Range Prediction for Flat Rayleigh Fading Channels", Proceedings of the IEEE International Symposium on Information Theory, Sorrento, Italy, Jun. 25-30, 2000.

Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.

Imai et al., "A New Multilevel Coding Method Using Error-Correcting Codes", IEEE Transactions on Information Theory, vol. IT-23, No. 3, 1977.

ITU Recommendation G.707/Y.1322, "Series G: Transmission systems and media, digital systems and networks, digital terminal equipments -general: Series Y: global information infrastructure and internet protocol aspects—transport; Network node interface for the syncronours digital hierarchy (SDH)", Oct. 2000.

ITU Recommendation G.783, "General Aspects of Digital Transmission Systems: Terminal Equipments—Characteristics of Syncronous Digital Hierarchy (SDH) Equipment Functional Blocks", Jan. 1994.

Sun J., "An Introduction to low Density Parity Check (LDPC) Codes", West Virginia University, Jun. 3, 2003.

Kschischang F., "Capacity Approching Codes, Iterative Decoding Algorithms and Their Application: Codes defined on Graphs", IEEE Communications Magazine, pp. 118-125, Aug. 2003.

Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson et al., "An Introduction to the Analysis of Iterative Coding Systems", Proceedings of the 1999 Institute for Mathematics and its Applications (IMA) Summer Program: codes, systems and graphical models, Minneapolis, USA Aug. 2-6, 1999.

Richardson etr al., "Capacity Approaching codes; Iterative Decoding Algorithms and Their Application: The Renaissance of Gallager's Low-Densityy parity Check Codes", IEEE Communications Magazine, pp. 126-131, Aug. 2003.

Riegel M., "Requirements for edge-to edge estimation of time deivision multiplexed (TDM) circuits over packet switching networks", IETF Network Working Group, RFC 4197, Oct. 2005.

Ryan et al., "An introduction to LDPC Codes", GlobeCom 2003, San Francisco, USA, Dec. 5, 2003.

Saroka et al., "Joint Carrier Phase Estimation and Turbo Decoding Using Bit-Carrier-Phase APP Decoder", IEEE Transactions on Communications, 2004.

Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.

Standard T1.102-1993 of the ANSI, "American National Standard for Telecommunications-Digital Hierarchy-Electrical Interfaces", Dec. 1993.

Worthen et al., "Unified Design of Iterative Receivers Using Factor Graphs", IEEE Transactions on Information Theory, vol. 47, No. 2, pp. 843-849, Feb. 2001.

Jin et al., "Analysis of Joint Channel Estimation and LDPC Decoding on Block Fading Channels", International Symposium on Information Theory and its Applications, ISITA2004, Parma, Italy, Oct. 10-13, 2004.

U.S. Appl. No. 11/394,172 Official Action dated Jan. 21, 2009.
U.S. Appl. No. 11/394,172 Official Action dated Jun. 16, 2008.
U.S. Appl. No. 11/394,172 Official Action dated Jun. 26, 2009.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.

* cited by examiner

MODEM CONTROL USING CROSS-POLARIZATION INTERFERENCE ESTIMATION

CROSS-REFERENCE TO RELATED APPLICATIONS

This application is related to U.S. patent application Ser. No. 10/881,601, filed Jun. 29, 2004, which is assigned to the assignee of the present patent application and whose disclosure is incorporated herein by reference.

FIELD OF THE INVENTION

The present invention relates generally to modems for wireless communications, and particularly to methods and systems for controlling the modem using cross-channel interference level estimation.

BACKGROUND OF THE INVENTION

Polarization diversity can be used in communication systems for providing two parallel communication channels having orthogonal polarizations over the same link, thus doubling the link capacity. Separate and independent signals are transmitted using the two orthogonal polarizations. Despite the orthogonality of the channels, however, some interference between the signals occurs almost inevitably. In order to reduce the effects of this interference, the receiver may comprise a cross-polarization interference canceller (XPIC), which processes and combines the two signals in order to recover the original, independent signals.

A variety of XPIC circuits are known in the art. XPIC circuits are described, for example, in U.S. Pat. Nos. 4,914,676, 5,920,595, 5,710,799, in European Patent Application EP 1365519 A1, and in PCT Patent Application WO 00/77952 A1, whose disclosures are all incorporated herein by reference.

In some applications, the interference cancellation process varies the phase of the interference signal. For example, U.S. Pat. No. 6,236,263, whose disclosure is incorporated herein by reference, describes a demodulator with a cross-polarization interference canceling function for canceling interference of cross polarization in the main polarization. The demodulator includes a demodulating unit for demodulating a baseband signal of the main polarization and a phase control unit which controls the phase of an interference signal of cross polarization, based upon an error in the demodulated signal. An interference cancellation unit cancels an interference signal component from the demodulated signal of the main polarization.

SUMMARY OF THE INVENTION

One of the factors that affect the performance of an XPIC circuit is the performance of a phase rotator, such as a mixer or multiplier controlled by a phase-locked loop (PLL), that adjusts the phase and frequency offset of the interference correction signal with respect to the desired signal being corrected. Embodiments of the present invention provide methods and devices for controlling the phase and/or frequency of this phase rotator, referred to herein as a "slave PLL."

In some embodiments, a control module in the XPIC circuit estimates signal characteristics, such as a cross-polarization interference ratio (XPD) of the received symbols. The control module then sets parameters of the slave PLL, such as its loop bandwidth and gain, responsively to the estimated signal characteristics. For this purpose, in some embodiments, the control module evaluates a metric function that depends on the estimated XPD values.

Another disclosed method addresses the problem of unlocked slave PLL under conditions of high XPD (low interference level). Using the disclosed method, the control module in the XPIC circuit detects situations in which the XPD falls below a predetermined threshold, searches for an appropriate frequency setting of the slave PLL, and loads the PLL with the appropriate frequency setting. This method ensures that the slave PLL locks on a correct frequency in cases in which the XPD deteriorates from high values to lower values, thus avoiding undesired transient events when the XPD value deteriorates.

A method for estimating the XPD value based on equalizer coefficient values in the XPIC circuit is also described. In some embodiments, the estimation method is used in conjunction with the PLL parameter setting method and/or the PLL locking method described herein.

An XPIC circuit whose slave PLL settings are adaptively controlled using the disclosed methods is also described.

The disclosed methods and systems can also be used for canceling interference types other than cross-polarization interference.

There is therefore provided, in accordance with an embodiment of the present invention, a receiver, including:

an input circuit, which is coupled to at least one antenna so as to receive, process and digitize first and second signals, thus generating first and second streams of input samples; and an interference cancellation circuit, including:

first and second adaptive filters, which are respectively coupled to filter the first and second streams of input samples using respective first and second coefficients to generate respective first and second filter outputs;

a phase rotator, which is adapted to apply a variable phase shift compensating for a phase deviation between the first and second signals, the phase rotator having at least one configuration parameter; and a control module, which is operative to estimate signal characteristics of the interference cancellation circuit, and to set the at least one configuration parameter of the phase rotator responsively to the estimated signal characteristics.

In an embodiment, the first signal contains interference due to the second signal, and the interference cancellation circuit is operative to produce responsively to the first and second streams of input samples a third stream of output samples representative of the first signal and having a reduced level of the interference.

In another embodiment, the control module is operative to identify an increase of a level of the interference and to set the at least one configuration parameter responsively to the identified increase. In yet another embodiment, the phase rotator includes a phase-locked loop (PLL), the at least one configuration parameter includes a frequency setting of the PLL, and the control module is operative, subsequent to identifying the increase of the level of the interference, to search over a predefined range of frequency settings for a best frequency setting determined responsively to the estimated signal characteristics, and to load the best frequency setting to the PLL.

In still another embodiment, the first and second signals are transmitted with respective first and second, mutually orthogonal polarizations, and the interference cancellation circuit is operative to reduce cross-polarization interference coupled from the second signal to the first signal.

In an embodiment, the phase rotator includes a phase-locked loop (PLL) and the at least one configuration parameter includes at least one of a loop bandwidth and a loop gain of the PLL. In another embodiment, the control module is operative to calculate the variable phase shift using at least one of a pilot-based and a batch-based phase estimation method.

In yet another embodiment, the signal characteristics include a level of a cross-coupling between the first and second signals. In still another embodiment, the first and second coefficients are determined adaptively in response to conditions on a communication channel over which the first and second signals are received, and the control module is operative to estimate the level of the cross-coupling by performing a calculation based on at least some of the first and second coefficients.

In an embodiment, the control module is operative to store two or more predefined control sets of the at least one configuration parameter, to evaluate a metric function responsively to the estimated signal characteristics, to choose a selected control set out of the two or more predefined control sets responsively to the evaluated metric function, and to load the chosen control set into the phase rotator. Additionally or alternatively, the control module is operative to adaptively calculate the at least one configuration parameter responsively to the estimated signal characteristics.

In an embodiment, the second signal contains interference due to the first signal, and the interference cancellation circuit is further operative to produce responsively to the first and second streams of input samples a fourth stream of output samples representative of the second signal and having a reduced level of the interference.

There is further provided, in accordance with an embodiment of the present invention, a wireless communication system, including:

a transmitter, which is operative to transmit first and second signals over the air; and a receiver, which includes:

an input circuit, which is coupled to at least one antenna so as to receive, process and digitize the first and second signals, thus generating first and second streams of input samples; and an interference cancellation circuit, including:

first and second adaptive filters, which are respectively coupled to filter the first and second streams of input samples using respective first and second coefficients to generate respective first and second filter outputs;

a phase rotator, which is adapted to apply a variable phase shift compensating for a phase deviation between the first and second signals, the phase rotator having at least one configuration parameter; and a control module, which is operative to estimate signal characteristics of the interference cancellation circuit, and to set the at least one configuration parameter of the phase rotator responsively to the estimated signal characteristics.

There is additionally provided, in accordance with an embodiment of the present invention, an interference cancellation circuit for processing first and second streams of input samples representing respective first and second signals, the circuit including:

first and second adaptive filters, which are respectively coupled to filter the first and second streams of input samples using respective first and second coefficients to generate respective first and second filter outputs;

a phase rotator, which is adapted to apply a variable phase shift compensating for a phase deviation between the first and second signals, the phase rotator having at least one configuration parameter; and a control module, which is operative to estimate signal characteristics of the interference cancellation circuit, and to set the at least one configuration parameter of the phase rotator responsively to the estimated signal characteristics.

There is also provided, in accordance with an embodiment of the present invention, a method for wireless communications, including:

receiving, processing and digitizing first and second signals transmitted over the air so as to generate first and second streams of input samples;

filtering the first and second streams of input samples using respective first and second coefficients to generate respective first and second filtered outputs;

applying a variable phase shift to one of the first and second filtered outputs using a phase rotator having at least one configuration parameter so as to generate a phase-shifted output compensating for a phase deviation between the first and second signals;

summing the first and second filtered outputs so as to generate a third stream of output samples, which is representative of the first signal;

estimating signal characteristics of the interference cancellation circuit; and setting the at least one configuration parameter of the phase rotator responsively to the estimated signal characteristics.

There is further provided, in accordance with an embodiment of the present invention, a method for estimating an interference level, including:

receiving, processing and digitizing first and second signals so as to generate first and second streams of input samples;

filtering the first and second streams of input samples using respective first and second coefficients to generate respective first and second filtered outputs;

estimating a level of interference contained in the first signal due to the second signal based on the first and second coefficients.

In an embodiment, filtering the first and second streams of input samples includes filtering the samples using respective first and second adaptive equalizers.

The present invention will be more fully understood from the following detailed description of the embodiments thereof, taken together with the drawings in which:

DETAILED DESCRIPTION OF EMBODIMENTS

System Description

Figure 1:
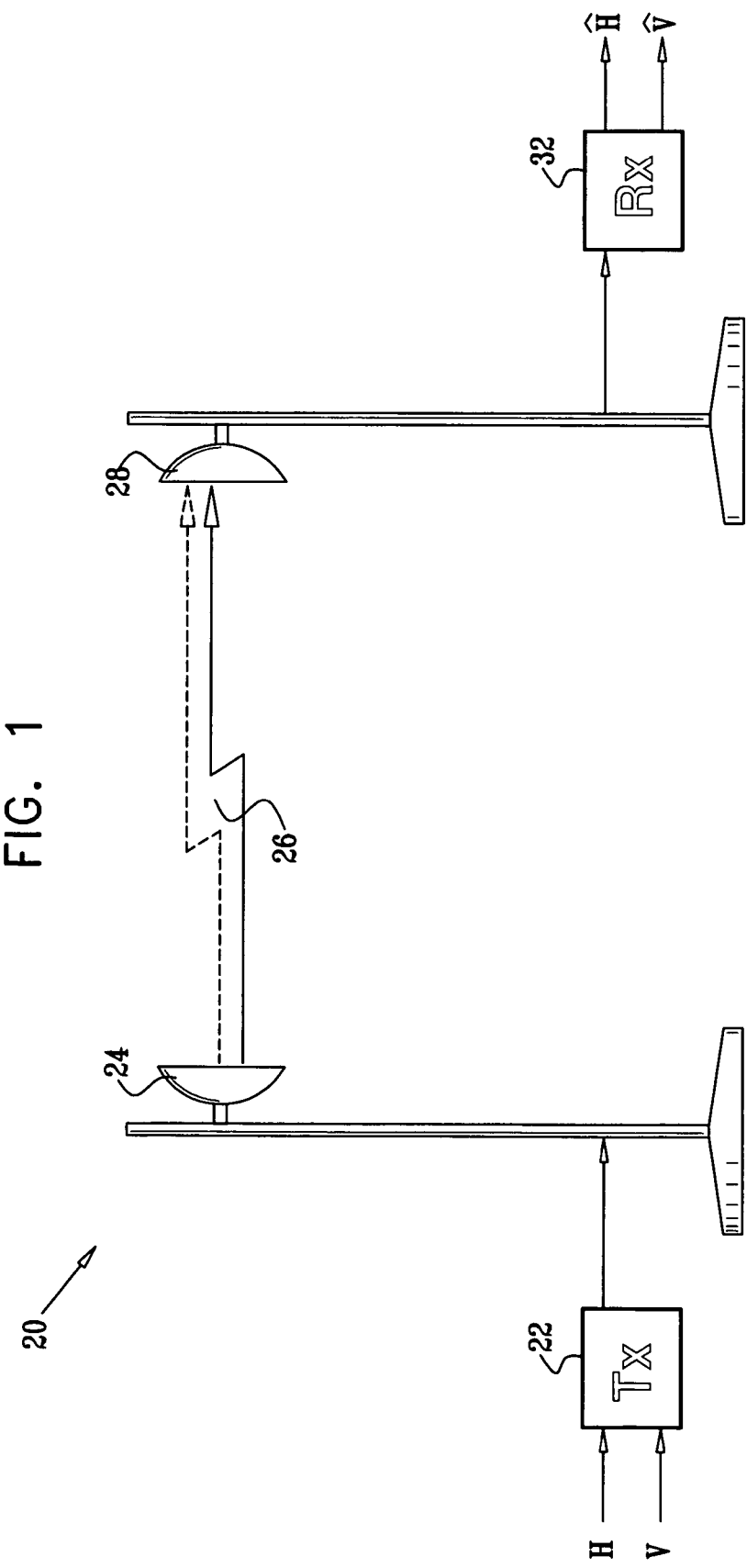
FIG. 1 is a schematic side view of a system for wireless data transmission over orthogonally-polarized channels, in accordance with an embodiment of the present invention.

FIG. 1 is a block diagram that schematically illustrates a wireless data transmission system 20, in accordance with an embodiment of the present invention. System 20 comprises a transmitter 22 that transmits two signals simultaneously via a transmit antenna 24 using polarization diversity. Transmitter 22 and antenna 24 are coupled to transmit the two signals as orthogonally-polarized electromagnetic waves. In the exemplary embodiment of FIG. 1, symbols denoted H are transmitted using horizontal polarization, and symbols denoted V are transmitted using vertical polarization. Alternatively, the signals may be transmitted using clockwise and counter-clockwise circular polarizations, +45° and −45° polarizations, or any other suitable orthogonal polarization configuration known in the art. Further alternatively, separate transmit antennas (and/or separate receive antennas) may be used for the two polarizations.

Typically, H and V represent symbols, which are modulated in accordance with a suitable modulation scheme and upconverted to a predetermined radio frequency (RF) range for transmission, as is known in the art. The signals pass through a wireless communication channel 26, which is defined and modeled below. The signals are received by a receive antenna 28. The signals received by antenna 28 are downconverted and processed by a receiver 32, in order to recover the transmitted symbols (and later on the digital data), represented as $\hat{H}$, $\hat{V}$ at the receiver output.

Figure 2:
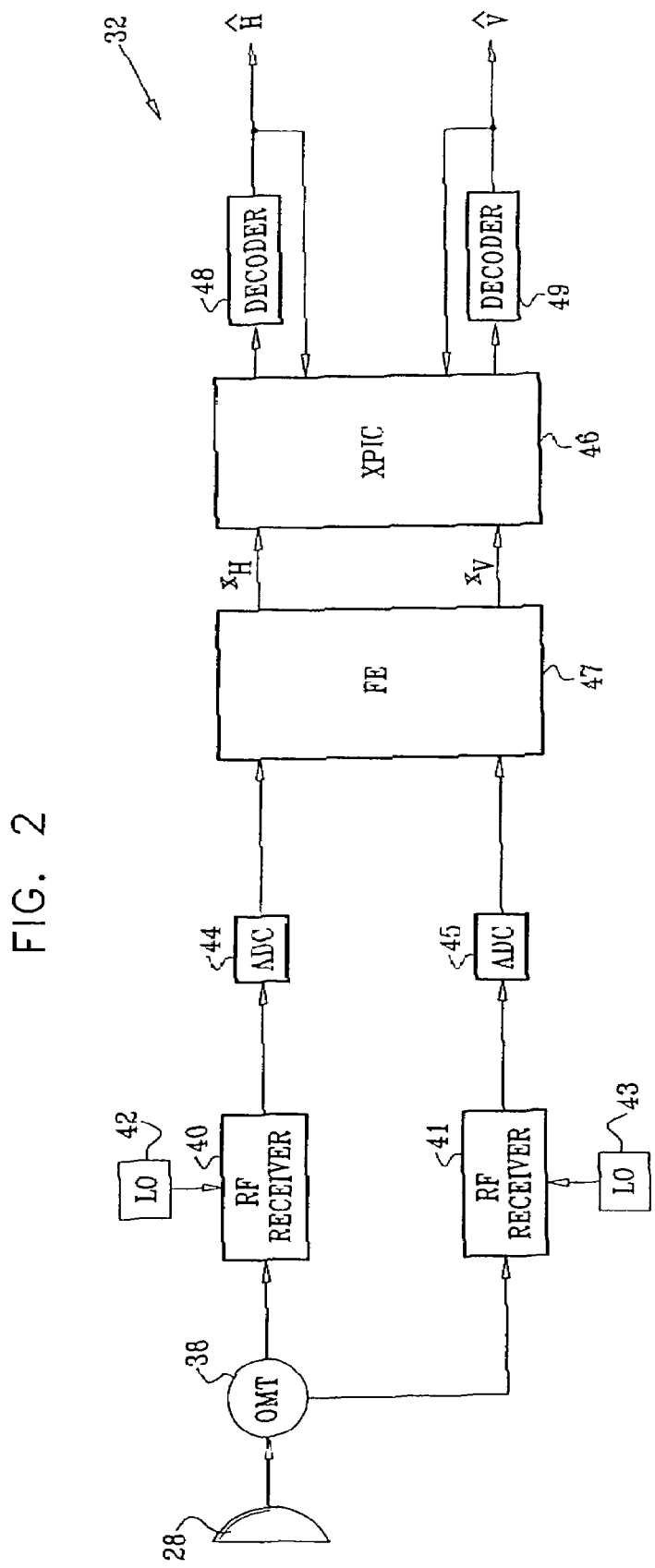
FIG. 2 is a block diagram that schematically illustrates a receiver used in the system of FIG. 1, in accordance with an embodiment of the present invention.

FIG. 2 is a block diagram showing elements of receiver 32, in accordance with an embodiment of the present invention. In the exemplary embodiment of FIG. 2, the signals received by antenna 28 are separated into two orthogonal polarization components by an orthogonal mode transducer (OMT) 38. In alternative embodiments, system 20 may comprise two separate receive antennas 28, one antenna for receiving each orthogonal component. The two orthogonal components are input to respective RF receiver circuits 40 and 41, which perform analog processing and downconvert the signal to a suitable baseband or intermediate frequency (IF). Downconversion of the received signals is performed by mixing the signals received by receiver circuits 40 and 41 with respective local oscillators (LOs) 42 and 43. In alternative embodiments, receiver circuits 40 and 41 can use a single common local oscillator. The downconverted signals are digitized by respective analog-to-digital converters (ADCs) 44 and 45.

The digitized signals are processed by a modem front end (FE) 47. The detailed functionality of front end 47 is not essential to the explanation of the present invention and may vary from one embodiment to another. In some embodiments, front end 47 comprises circuitry that performs functions such as automatic gain control (AGC), sampling rate conversion and timing recovery. The modem front end generates two streams of digital input samples denoted $x_H$ and $x_V$, representing the received signals.

A cross-polarization interference canceller (XPIC) 46 filters and combines the sample streams $x_H$ and $x_V$ in order to generate streams of corrected output samples. Respective decoders 48 and 49, such as slicers, process each of the streams of output samples in order to generate respective sequences of symbol estimates denoted $\hat{H}$, $\hat{V}$. These symbols are then demodulated to recover estimates of the transmitted data.

Figure 3:
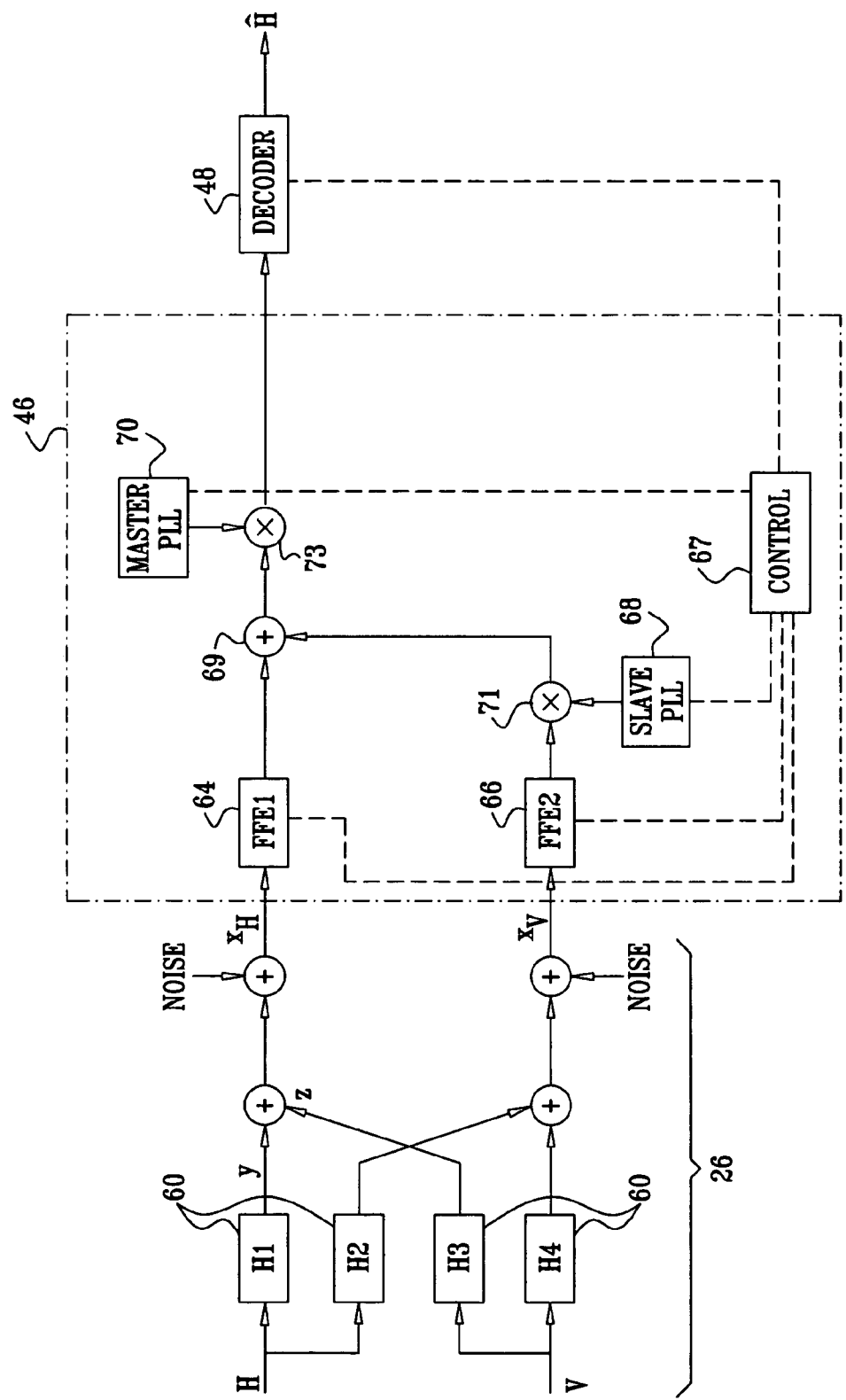
FIG. 3 is a block diagram that schematically illustrates details of a communication channel and of a cross-polarization interference canceller (XPIC), in accordance with an embodiment of the present invention.

FIG. 3 is a block diagram that schematically illustrates details of communication channel 26 and of cross-polarization interference canceller (XPIC) 46, in accordance with an embodiment of the present invention. Communication channel 26 between transmit antenna 24 and receive antenna 28 is modeled as having a horizontal polarization channel and a vertical polarization channel, respectively defining the transfer characteristics of the signals as they pass through channel 26. Communication channel 26 is subject to fading and additive noise within each polarization component, as well as to coupling, or cross-polarization interference, between the polarization components (In the description that follows, elements of system 20 not essential to the explanation were omitted for the sake of clarity. For example, RF receiver circuits 40 and 41, ADCs 44 and 45 and front end 47 are not shown in FIG. 3).

Channel 26 is modeled using four channel transfer functions 60 denoted $H_1, \ldots, H_4$, wherein $H_1$ defines the transfer function of the horizontal polarization component and $H_4$ defines the transfer function of the vertical polarization component. Transfer function $H_2$ defines the cross-coupling of the horizontal signal into the vertical component, and transfer function $H_3$ defines the coupling of the vertical signal into the horizontal component.

Typically, thermal noise is also added to the two polarization components, as part of communication channel 26. In general, the communication channel described by functions $H_1, \ldots, H_4$ may comprise a time-varying, frequency-selective dispersive channel. Functions $H_2$ and $H_3$ define the cross-polarization interference between the horizontal and vertical channels. Receiver 32, and in particular XPIC 46, adaptively cancels this interference.

A cross-polarization interference ratio, denoted XPD, is defined as XPD =10 log $[\overline{P}_{des}/\overline{P}_{int}]$, wherein $\overline{P}_{des}$ denotes the average power of the desired component and $\overline{P}_{int}$ denotes the average power of the interference component in each receiver channel. XPD is usually represented on a logarithmic scale. For example, high XPD values, on the order of 35 dB, correspond to low interference levels that usually have a negligible effect on the receiver performance. XPD values smaller than about 10 dB often cause significant degradation in the receiver performance. In some cases, XPD takes different values in the horizontal and vertical channels. In other words, the cross-polarization interference from the vertical channel to the horizontal channel may be different (either higher or lower) from the interference from the horizontal channel to the vertical channel.

XPIC 46 comprises two digital processing channels (referred to herein as the horizontal and vertical processing channels) for processing the two polarization components. FIG. 3 shows only the horizontal channel that decodes symbols H. Each digital processing channel comprises two pipelines, each comprising a feed-forward equalizer (FFE). The horizontal processing channel shown in FIG. 3 comprises a main pipeline, which processes the $x_H$ sample stream, and an auxiliary pipeline, which processes the $x_V$ sample stream. The vertical processing channel uses $x_H$ and $x_V$ to decode symbol V using a similar configuration. In order to cancel the cross-polarization interference present in sample stream $x_H$, XPIC 46 filters sample streams $x_H$ and $x_V$ using respective filters, such as FFEs 64 and 66, denoted FFE1 and FFE2. In some embodiments, the equalizers are implemented using multi-tap, time-domain finite impulse response (FIR) digital filters, as are known in the art. Alternatively, the filters can be implemented using any other suitable digital filtering method, such as infinite impulse response (IIR) and frequency-domain filtering methods. FFE1 and FFE2 each comprise multiple coefficients that define the transfer function of the equalizer.

A control module 67 adaptively modifies the coefficients of FFE1 and FFE2, thereby modifying the transfer functions of the two equalizers. In general, module 67 determines the optimum coefficient values that compensate for the interference from the vertical polarization component to the horizontal polarization component (modeled by function $H_3$ in channel 26).

Control module 67 adjusts the phase of the output of the auxiliary pipeline by controlling a phase rotator provided at the output of FFE2. In some embodiments the phase rotator comprises a phase-locked loop (PLL) 68, referred to as a "slave PLL." The output of slave PLL 68 is mixed with the output of FFE2 using a mixer 71, so as to rotate the phase of the auxiliary pipeline. The phase-adjusted signal is combined with the output of the main pipeline using an adder 69.

Although the description that follows mainly addresses the use of a phase-locked loop for applying a phase shift, or phase rotation to the output of the auxiliary pipeline, the desired phase rotation value may alternatively be estimated using any suitable phase estimation method known in the art, such as, for example, pilot-based or batch-based methods. In these alternative embodiments, control module 67 calculates the desired phase rotation and controls the phase rotator (comprising mixer 71) so as to apply the rotation to the output of the auxiliary pipeline.

The phase rotation introduced by slave PLL 68 ensures that the outputs of the main and auxiliary pipelines are combined with the appropriate phase offset, so as to minimize the residual cross-polarization interference in the horizontal channel. This phase offset may change, for example, because of phase noise or because of changes in the wave propagation characteristics of communication channel 26. In embodiments in which receiver circuits 40 and 41 use separate local oscillators 42 and 43, the phase rotation introduced by slave PLL 68 is also used to compensate for frequency offsets between the two LOs. In some embodiments, the combined output signal is phase-rotated by another phase rotator, referred to as a master PLL 70, and a mixer 73. The phase-rotated combined output signal is provided to decoder 48 that determines estimates $\hat{H}$ of the transmitted symbols. In alternative embodiments, master PLL 70 and mixer 73 are located before adder 69. In these embodiments, the output of the main pipeline is first phase-rotated by master PLL 70, and then combined with the output of the auxiliary pipeline adder 69.

The components of XPIC 46, including equalizers 64 and 66 and PLLs 68 and 70, are typically implemented as digital hardware circuits in an integrated circuit, such as an application-specific integrated circuit (ASIC). In particular, the phase adjustment operations, shown as multiplications in FIG. 3, are implemented as digital arithmetic operations on the relevant sample streams. Control module 67 can be implemented in hardware, in software running on a suitable microprocessor, or as a combination of hardware and software functions.

Further aspects of the operation and adaptation of an XPIC circuit that may be applied in XPIC 46 are described in U.S. patent application Ser. No. 10/881,601 cited above. The digital demodulation circuits and other processing elements not essential to an understanding of the present invention are omitted from the figures here for the sake of simplicity. The additional elements required in receiver 32 will be apparent to those skilled in the art, depending on the particular modulation scheme and communication protocols used in system 20.

As noted above, FIG. 3 shows only one digital processing channel that decodes the horizontal polarization signal with reduced cross-polarization interference. Typically, XPIC 46 comprises an additional vertical processing channel, similar in structure to the configuration shown in FIG. 3, which similarly receives sample streams $x_H$ and $x_V$ and decodes the vertical polarization signal. In the main and auxiliary pipelines of the vertical processing channel (not shown), an equalizer denoted FFE4 is analogous with FFE1 and an equalizer denoted FFE3 is analogous with FFE2. In some embodiments, a single control module 67 controls all four pipelines. Alternatively, FFE1 and FFE2 are controlled by one control module 67, while another such module controls FFE3 and FFE4.

PLLs, as are known in the art, comprise a closed control loop, whose gain and bandwidth settings determine the performance of the PLL. For example, a wide bandwidth enables rapid phase changes and faster stabilization time, but sometimes produces a higher level of residual phase noise. A narrow bandwidth, on the other hand, often provides smoother but slower dynamic performance.

In cases of severe phase noise, the gain and bandwidth of the loop often have a direct effect on the stability of the loop, often measured by its Mean Time to Loose Lock (MTLL). Typically, for any given phase noise and signal-to-noise ratio there exists a particular optimal PLL loop setting that maximizes the MTLL. Such well-known trade offs in PLL design are described, for example, by Best in "Phase Locked Loops: Design, Simulation, And Applications," McGraw Hill, Fifth edition, June 2003.

In some embodiments, module 67 sets configuration parameters of slave PLL 68, such as its loop bandwidth and loop gain, so as to improve the performance of receiver 32. In some embodiments, module 67 determines the desired PLL parameter values of slave PLL 68 responsively to an estimated value of the cross-polarization interference level, or XPD, as will be described in detail below.

In order to determine the appropriate slave PLL parameters, control module 67 estimates the current XPD value based on the known coefficient values of equalizers FFE1, . . . , FFE4 in XPIC 46. The following description defines a method for calculating the estimated XPD value. Alternatively, any other suitable estimation method can be used for this purpose.

XPD Estimation Method

Following the notation of FIG. 3, XPD can be written as:

$$XPD = 10 \log \frac{R_{yy}[0]}{R_{xx}[0]}, \quad [1]$$

wherein $y = H * H_1$ and $z = V * H_3$. In other words, signal y is the desired horizontal polarization signal, produced by a convolution of symbols H with the (time domain) channel transfer function $H_1$. Signal z is the interference component of symbols V that are coupled into the horizontal channel. Therefore, z is produced by convolving symbols V with channel transfer function $H_3$. $R_{yy}[0]$ denotes the autocorrelation function of signal y, evaluated at offset 0, which is equal to the average power of signal y. Similarly, $R_{zz}[0]$ is equal to the average power of the interference signal z.

We shall now express the two autocorrelation functions $R_{yy}[m]$ and $R_{zz}[m]$ in terms of channel transfer functions $H_1$ and $H_3$. Using a discrete-time model, $H_1$ and $H_3$ are represented as two FIR filters having coefficients $H_1[m]$ and $H_3[m]$, respectively. We can then write:

$$R_{yy}[m] = \sum_k H_1[-k]R_{yH}[m-k] \qquad [2]$$

$$R_{yH}[n] = \sum_l H_1[l]R_{HH}[n-l], \qquad [3]$$

wherein $R_{yH}[n]$ denotes the cross-correlation function between signals y and H. From equations [2] and [3] above we get:

$$R_{yy}[0] = \sum_k H_1[-k]R_{yH}[-k] = \sum_k H_1[-k]\sum_l H_1[l]R_{HH}[-k-l] \qquad [4]$$

Substituting m=k+l we get:

$$R_{yy}[0] = \sum_l \sum_m H_1[l-m]H_1[l]R_{HH}[-m]. \qquad [5]$$

We assume that symbols H are uncorrelated, so that $R_{HH}[m]=0\ \forall m \neq 0$. Therefore, we can write:

$$R_{yy}[0] = R_{HH}[0]\sum_l H_1[l]^2. \qquad [6]$$

Thus, we have expressed $R_{yy}[0]$ in terms of the coefficients of $H_1$. Using a similar derivation, we can express $R_{zz}[0]$ in terms of the coefficients of $H_3$:

$$R_{zz}[0] = R_{VV}[0]\sum_l H_3[l]^2 \qquad [7]$$

We now combine equations [6] and [7] into a single expression that gives XPD as a function of the coefficients of $H_1$ and $H_3$:

$$\begin{aligned} XPD &= 10\log\frac{R_{yy}(0)}{R_{zz}(0)} \\ &= 10\log\frac{R_{HH}[0]\sum_l H_1[l]^2}{R_{VV}[0]\sum_l H_3[l]^2} \\ &= 10\log\frac{\sum_l H_1[l]^2}{\sum_l H_3[l]^2} \end{aligned} \qquad [8]$$

wherein in the last equation it is assumed that the average powers of transmitted signals H and V are equal.

We shall now express the channel transfer functions $H_1[m]$ and $H_3[m]$ in terms of the coefficients of equalizers FFE1, ..., FFE4. We assume that thermal noise contribution is relatively small (also referred to as a "zero-forcing" solution). Using frequency domain calculation we can write:

$$\begin{pmatrix} X_H \\ X_V \end{pmatrix} = \begin{pmatrix} \tilde{H}_1 & \tilde{H}_3 \\ \tilde{H}_2 & \tilde{H}_4 \end{pmatrix}\begin{pmatrix} \tilde{H} \\ \tilde{V} \end{pmatrix} \qquad [9]$$

wherein $x_H$ and $x_V$ are the frequency-domain representations of sample streams $x_V$ and $x_H$ at the input to XPIC 46, respectively. $\tilde{H}$ and $\tilde{V}$ are the frequency-domain representations of symbols H and V, respectively. $\tilde{H}_1, \ldots, \tilde{H}_4$ denote the frequency-domain representations of channel transfer functions $H_1, \ldots, H_4$, respectively. Equivalently, we can write:

$$\begin{pmatrix} \tilde{H} \\ \tilde{V} \end{pmatrix} = \begin{pmatrix} \tilde{H}_1 & \tilde{H}_3 \\ \tilde{H}_2 & \tilde{H}_4 \end{pmatrix}^{-1}\begin{pmatrix} X_H \\ X_V \end{pmatrix} = \frac{1}{\tilde{H}_1\tilde{H}_4 - \tilde{H}_2\tilde{H}_3}\begin{pmatrix} \tilde{H}_4 & -\tilde{H}_3 \\ -\tilde{H}_2 & \tilde{H}_1 \end{pmatrix}\begin{pmatrix} X_H \\ X_V \end{pmatrix} \qquad [10]$$

Solving for $\tilde{H}$ gives $$\tilde{H} = \frac{\tilde{H}_4}{\tilde{H}_1\tilde{H}_4 - \tilde{H}_2\tilde{H}_3}X_H - \frac{\tilde{H}_3}{\tilde{H}_1\tilde{H}_4 - \tilde{H}_2\tilde{H}_3}X_V. \qquad [11]$$

It can be seen that if we set the frequency-domain transfer functions of FFE1 and FFE2 (denoted $FF\tilde{E}1$, $FF\tilde{E}2$) to be:

$$FF\tilde{E}1 = \frac{\tilde{H}_4}{\tilde{H}_1\tilde{H}_4 - \tilde{H}_2\tilde{H}_3} \qquad [12]$$

and $$FF\tilde{E}2 = \frac{-\tilde{H}_3}{\tilde{H}_1\tilde{H}_4 - \tilde{H}_2\tilde{H}_3} \qquad [13]$$

then receiver 32 reconstructs signal $\hat{H}$ with perfect cancellation of the cross-polarization interference. A similar derivation provides:

$$FF\tilde{E}3 = \frac{-\tilde{H}_2}{\tilde{H}_1\tilde{H}_4 - \tilde{H}_2\tilde{H}_3} \qquad [14]$$

and $$FF\tilde{E}4 = \frac{\tilde{H}_1}{\tilde{H}_1\tilde{H}_4 - \tilde{H}_2\tilde{H}_3}. \qquad [15]$$

Equations [12]-[15] (zero forcing solution) can be solved together to provide $\tilde{H}_1$, $\tilde{H}_2$, $\tilde{H}_3$ and $\tilde{H}_4$ as a function of $FF\tilde{E}1$, $FF\tilde{E}2$, $FF\tilde{E}3$ and $FF\tilde{E}4$. For example, we can define:

$$T = FF\tilde{E}1 \cdot FF\tilde{E}4 - FF\tilde{E}2 \cdot FF\tilde{E}3 \qquad [16]$$

which gives:

$$\tilde{H}_1 = \frac{FF\tilde{E}4}{T}, \tilde{H}_3 = \frac{FF\tilde{E}2}{T}, \qquad [17]$$

Returning to equation [8], we can use the well-known Parseval theorem to write:

$$XPD = 10\log\frac{\sum_l H_1[l]^2}{\sum_l H_3[l]^2} = 10\log\frac{\sum_i |\tilde{H}_1[\omega_i]|^2}{\sum_i |\tilde{H}_3[\omega_i]|^2} \quad [18]$$

wherein $$\sum_i |\tilde{H}_1[\omega_i]|^2 \text{ and } \sum_i |\tilde{H}_3[\omega_i]|^2$$

sum over the discrete frequency-domain components of $\tilde{H}_1$ and $\tilde{H}_3$, respectively. Since the values of these frequency-domain components are known from the solution to equations [12]-[15], these values are substituted into equation [18] to provide an estimate of XPD as a function of the coefficients of equalizers FFE1, . . . , FFE4.

In some embodiments, simplifying assumptions can be used to further simplify the estimation process. For example, in some practical scenarios channel 26 can be considered to be symmetrical, i.e., $H_1 = H_4$, $H_2 = H_3$. In such cases, equations [12]-[15] can be reduced to two equations that only use $FF\tilde{E}1$ and $FF\tilde{E}2$.

In other embodiments, the zero forcing assumption may be relaxed. In such cases, equations [12]-[15] are not valid and should include the effect of the thermal noise.

Slave PLL Operational Modes

In some embodiments, it is desirable to adjust parameters of slave PLL 68 in accordance with signal characteristics of the XPIC circuit, such as the current XPD value. Typically, such optimization of slave PLL parameters improves the mean square error (MSE) and/or the bit error rate (BER) at decoder 48. Optimization of PLL parameters based on XPD also increases the "mean time to lose lock" (MTLL) of the PLL.

Generally speaking, receiver 32 operates in the presence of two types of noise: thermal white noise and phase noise. When the thermal noise is dominant, it is usually desirable to average over a relatively long time interval. Averaging of this sort corresponds to having a narrow loop bandwidth. When the phase noise is dominant, on the other hand, it is often desirable to try and track the phase error. Tracking of this sort corresponds to having a wide loop bandwidth. Thus, there is typically a trade-off between the two types of noise. For any given level of phase noise and thermal noise there exists an optimal PLL bandwidth that maximizes MTLL and/or minimizes BER and MSE. Similar trade-offs exist with respect to the loop gain.

Figure 4A:
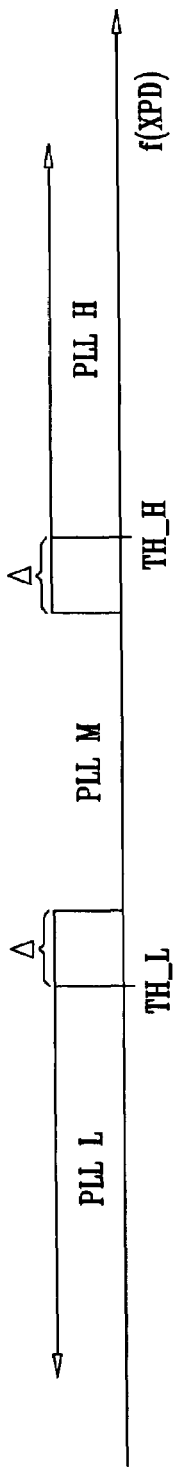
FIG. 4A is a diagram that schematically illustrates a metric function for setting operational modes of a phase-locked loop (PLL) circuit, in accordance with an embodiment of the present invention.
Figure 4B:
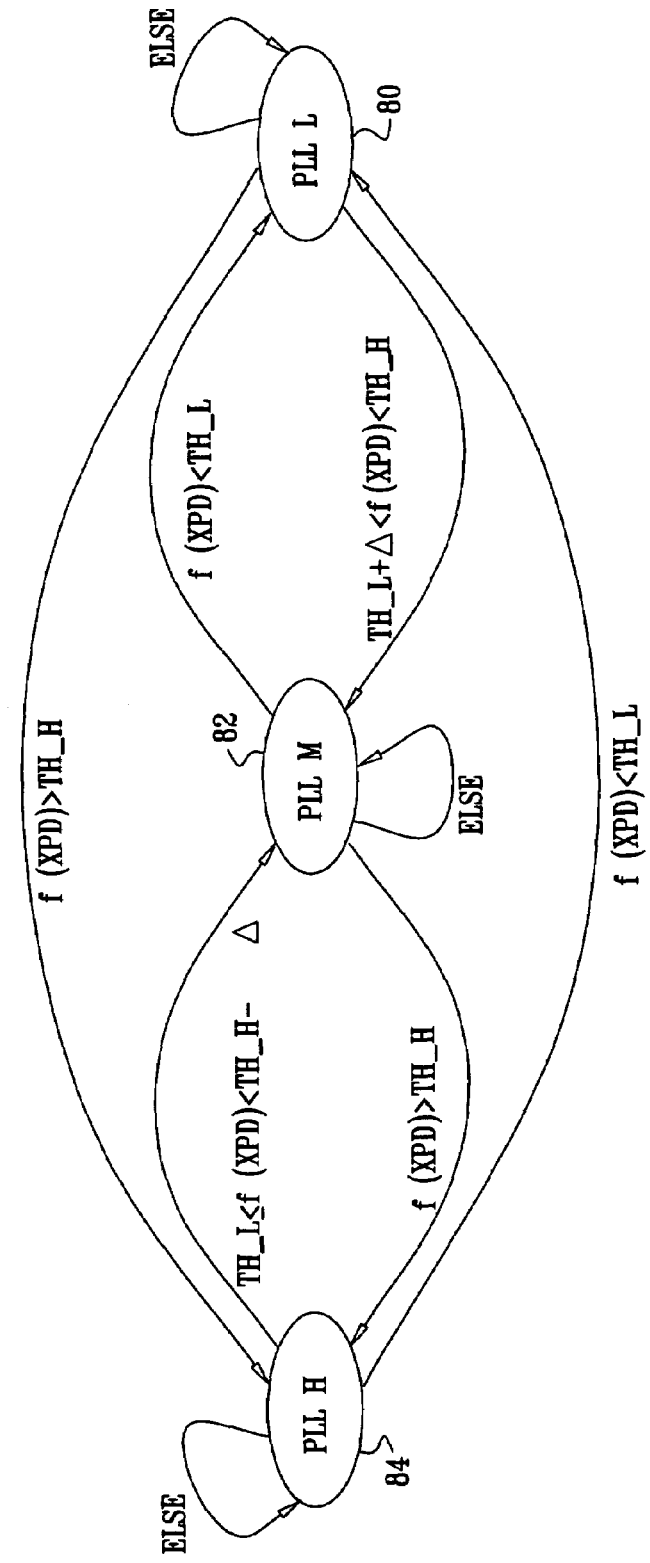
FIG. 4B is a state diagram that schematically illustrates transitions between operational modes of a PLL circuit, in accordance with an embodiment of the present invention.

In some embodiments, control module 67 loads slave PLL 68 with one of several predetermined sets of configuration parameters (sometimes referred to as control sets) responsively to estimated XPD. In the example of FIGS. 4A and 4B, three parameter sets, denoted PLL_L, PLL_M and PLL_H, are defined. When loaded with the PLL_L parameter set, slave PLL 68 operates with relatively low loop gain. The PLL_H set comprises relatively high loop gain and the PLL_M set comprises an intermediate value. In some embodiments, control module 67 estimates the current value of XPD based on the FFE1, . . . , FFE4 equalizer coefficients, using the estimation method described above. The estimated XPD value is then used to determine which of the parameter sets should be loaded to the slave PLL.

FIG. 4A is a diagram that schematically illustrates an exemplary metric function denoted f(XPD) for setting operational modes of slave PLL 68, in accordance with an embodiment of the present invention. In the example of FIG. 4A, the range of values taken by f(XPD), shown by the horizontal axis of the figure, is divided into three regions, wherein each region corresponds to one of the three predefined parameter sets. Control module 67 compares f(XPD) to two thresholds denoted TH_L and TH_H, in order to determine the appropriate parameter set to be loaded to slave PLL 68. In some embodiments, a hyteresis interval denoted Δ is used near each of the thresholds, to avoid excessive parameter switching when the value of f(XPD) is close to one of the thresholds.

In an exemplary embodiment, the thresholds and parameter sets are arranged so that for XPD=0 dB the gain of slave PLL 68 is set to be equal to the gain of master PLL 70. From this point, the gain of slave PLL 68 should be doubled for every 6 dB change in the XPD value. For example, TH_H can be set so that when XPD=12 dB the gain of slave PLL 68 is four times higher than the gain of master PLL 70. Alternatively, any other suitable arrangement of thresholds and parameter values can be used.

FIG. 4B is a state diagram that schematically illustrates transitions between the operational modes of slave PLL 68, in accordance with an embodiment of the present invention. In the state diagram of FIG. 4B, the operation of slave PLL 68 is described in terms of three states 80, 82 and 84. The three states correspond with the parameter sets PLL_L, PLL_M and PLL_H, respectively. State transitions are represented by arrows, with the corresponding condition for transition attached to each arrow.

For example, when the slave PLL is in PLL_L state 80 (i.e., loaded with the PLL_L parameter set), control module 67 periodically evaluates f(XPD). If f(XPD)>TH_H, module 67 loads slave PLL 68 with the PLL_H parameter set, thereby moving to PLL_H state 84. If, on the other hand, TH_L+Δ<f(XPD)≦TH_H, module 67 loads slave PLL 68 with the PLL_M parameter set, moving to PLL_M state 82. Otherwise, the PLL remains in PLL_L state 80.

The state diagram also demonstrates the use of hysteresis interval Δ. For example, consider a scenario in which the value of f(XPD) is close to TH_L. In order to move from PLL_L state 80 to PLL_M state 82, f(XPD) has to be larger than TH_L+Δ. In order to move in the opposite direction, from PLL_M to PLL_L, f(XPD) has to be smaller than TH_L.

FIG. 4B shows the states and state transitions when receiver 32 is in steady-state operation, after all acquisition processes between transmitter 22 and receiver 32 have ended. In some embodiments, after the receiver initially acquires the transmitter signals, control module 67 evaluates the current XPD value. Based on this estimate, module 67 determines whether to begin steady-state operation from state PLL_L, PLL_M or PLL_H.

The exemplary embodiment of FIGS. 4A and 4B described three sets of configuration parameters and two thresholds. Alternatively, any number of slave PLL states, parameters and/or parameter sets can be defined. Any other suitable mechanism can be used to determine the desired slave PLL configuration parameters based on estimated XPD values. Further alternatively, module 67 may also adaptively calculate the values of the configuration parameters based on the estimated XPD value, without using predetermined parameter sets.

Maintaining Slave PLL Lock

Figure 5:
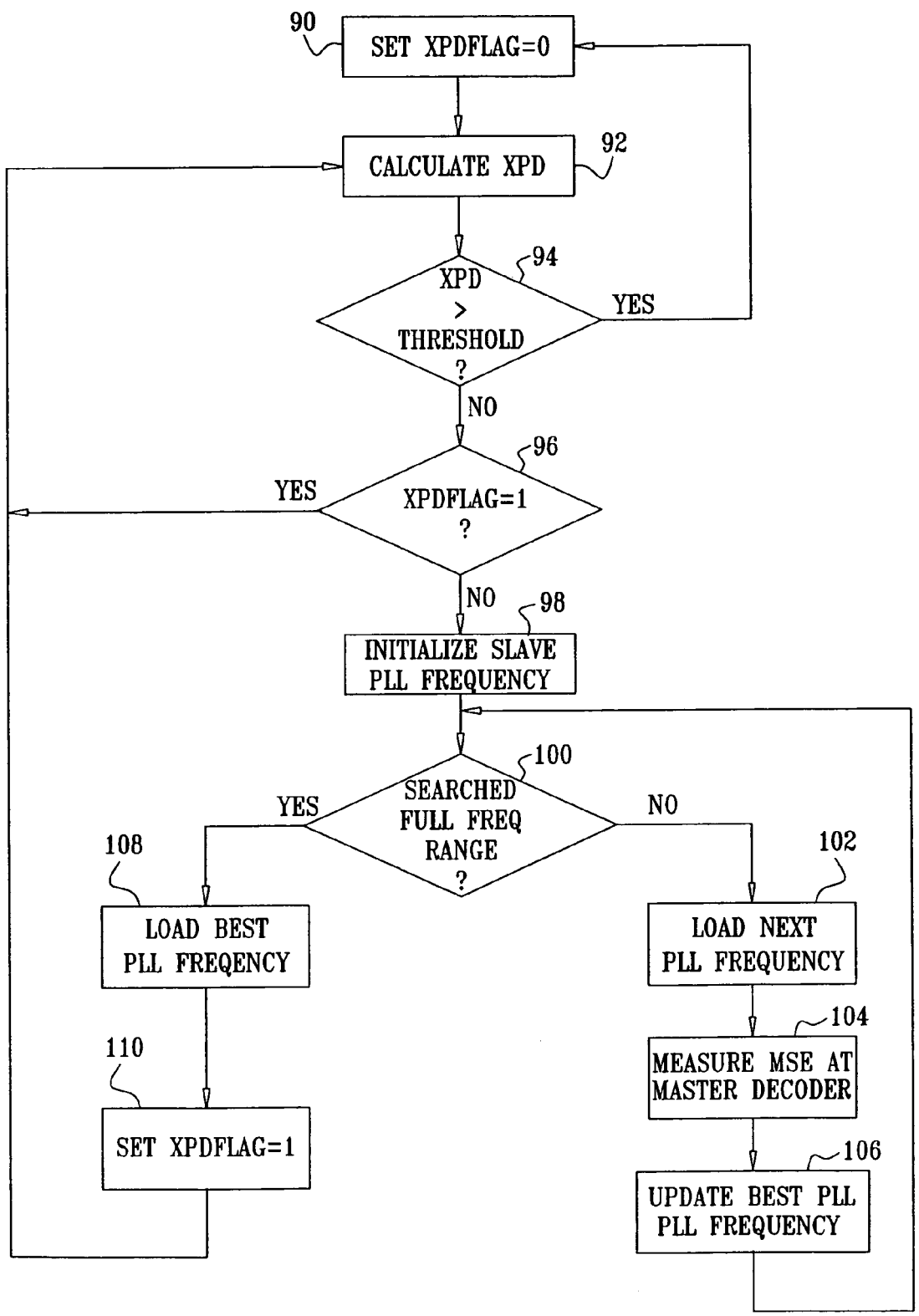
FIG. 5 is a flow chart that schematically illustrates a method for controlling a PLL circuit, in accordance with an embodiment of the present invention.

FIG. 5 is a flow chart that schematically illustrates a method for controlling slave PLL 68, in accordance with an embodiment of the present invention. As noted above, the phase rotation introduced by slave PLL 68 may depend on the phase noise, on the wave propagation characteristics of channel 26, as well as on the frequency offset between the local oscillators of receiver circuits 40 and 41. During normal operation, when the level of cross-polarization interference is low (i.e., XPD is high), the effect of the cross-polarization correction signal (i.e., the output of FFE2) on the performance of decoder 48 is often unnoticeable. In this scenario, slave PLL 68 may not be locked, however this has no effect on the performance of receiver 32.

When the XPD deteriorates, the effect of the correction signal (the output of FFE2) on the performance of decoder 48 suddenly becomes significant. This degradation often occurs very rapidly. If slave PLL 68 is unlocked, the output of FFE2 will be combined with the output of FFE1 at an incorrect phase. The receiver will continue to operate under the degraded conditions until the frequency and phase of PLL 68 are corrected. Recovering from this situation may cause severe BER degradation for extended periods of time, and even loss of receiver tracking. The method of FIG. 5 ensures that slave PLL 68 is locked with correct phase and frequency setting when the XPD decreases and is ready to cancel-out the cross-polarization interference.

The method begins with decoder 48 in steady state operation, after all acquisition processes have ended. Control module 67 defines a flag denoted XPDFLAG and sets it to zero, at an initialization step 90. XPDFLAG=0 indicates that it is currently desired to perform slave PLL frequency updating. The use of XPDFLAG will be explained below.

Module 67 estimates the value of XPD, at an XPD estimation step 92. In some embodiments, control module 67 estimates XPD based on the FFE1, . . . , FFE4 equalizer coefficients, using the estimation method described above. Alternatively, any other suitable method for estimating XPD can also be used. Module 67 compares the estimated XPD value to a predetermined XPD threshold, at a threshold checking step 94. Typically, the threshold is chosen to be an intermediate value, in which the effect of cross-polarization interference on the performance of decoder 48 is noticeable, but not yet harmful. For example, when using 128 QAM modulation, XPD threshold values on the order of ~25 dB are often considered suitable for this purpose.

If the estimated XPD is greater than the threshold, the method returns to step 90 and continues to monitor XPD. If, on the other hand, the estimated XPD drops below the threshold value, module 67 checks whether it is desired to perform PLL frequency updating, at an update checking step 96. If an update is not desired (XPDFLAG=1) the method returns to step 92 and continues to monitor XPD. Otherwise, in steps 98-106 below, control module 67 performs a search for the best-performing frequency setting, over a predefined range of frequency settings of slave PLL 68.

Control module 67 initializes the slave PLL frequency, typically to a frequency at the center of the search range, at a search initialization step 98. Module 67 checks whether the entire range has been searched, at a completion checking step 100. If the search has not yet been completed, module 67 loads the slave PLL with the next frequency setting in the range, at a frequency setting step 102.

In some embodiments, the search range is covered in a back-and-forth manner. In these embodiments, the search begins at the center of the search range. The control module loads frequency settings that gradually move away from the center of the search range of both sides of the center frequency. Alternatively, any other suitable search strategy can be used to apply frequency setting step 102.

In some embodiments, module 67 allows the newly-programmed slave PLL to stabilize after each frequency setting by waiting for a predetermined time duration, or by verifying that the PLL is locked.

Once the PLL frequency stabilizes at the next frequency setting, module 67 queries the MSE value that corresponds to the current PLL frequency setting, at an MSE measurement step 104. The MSE is measured by decoder 48 and provided to module 67. Module 67 checks whether the current MSE value is the best (lowest) MSE value measured so far during the present search, at a best MSE updating step 106. If the current MSE is the best value so far, module 67 temporarily records this value together with the corresponding PLL frequency setting. The method then loops back to completion checking step 100 to continue searching over the predetermined search range.

Once the entire search range has been covered, control module 67 loads slave PLL 68 with the frequency that provided the best MSE, at a best frequency setting step 108. Module 67 then sets XPDFLAG=1, at a flag setting step 110. The method then returns to XPD estimation step 92 to continue monitoring XPD.

The main purpose of the XPDFLAG mechanism is to avoid updating the PLL frequency when not necessary. For example, if an update has been performed, and XPD is smaller than the XPD threshold, it is not necessary to perform an update. Under these conditions, it is assumed that the cross-polarization interference is strong enough to enable FFE2 to output a valid correction signal, implying that slave PLL 68 is locked on a correct frequency. In this case, the method loops in steps 92-96 until the estimated XPD crosses the threshold.

Although the embodiments described above relate to receiving and reducing interference in signals transmitted at orthogonal polarizations, the principles of the present invention may more generally be applied to reducing interference in signals received by multi-channel wireless receivers of other types. For example, in an interference-limited environment, a system could use one antenna to collect a desired signal, which is perturbed by an interfering signal. A second antenna could be used to collect the interfering signal. Feeding the two signals into a digital processing channel will result in attenuation of the interfering signal content at the decoder. Furthermore, the receiver design described herein is also useful in improving the signal-to-noise ratio of a communication system by means of polarization diversity, even when the transmitter does not transmit signals at orthogonal polarizations.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A receiver, comprising:
   an input circuit, which is coupled to at least one antenna so as to receive, process and digitize first and second signals, thus generating first and second streams of input samples; and
   an interference cancellation circuit, comprising:
      first and second adaptive filters, which are respectively coupled to filter the first and second streams of input samples using respective first and second coefficients to generate respective first and second filter outputs;
      a phase rotator, which is adapted to apply a variable phase shift between the first and second signals, the phase rotator having at least one configuration parameter; and
      a control module, which is operative to compute the variable phase shift and to provide the variable phase shift to the phase rotator so as to compensate for a phase deviation between the first and second signals, to estimate interference in the first signal due to the second signal, and to set the at least one configuration parameter of the phase rotator responsively to the estimated interference.

2. The receiver according to claim 1, wherein the interference cancellation circuit is operative to produce responsively to the first and second streams of input samples a third stream of output samples representative of the first signal and having a reduced level of the interference.

3. The receiver according to claim 2, wherein the control module is operative to identify an increase of a level of the interference and to set the at least one configuration parameter responsively to the identified increase.

4. The receiver according to claim 3, wherein the phase rotator comprises a phase-locked loop (PLL), wherein the at least one configuration parameter comprises a frequency setting of the PLL, and wherein the control module is operative, subsequent to identifying the increase of the level of the interference, to search over a predefined range of frequency settings for a best frequency setting determined responsively to the estimated interference, and to load the best frequency setting to the PLL.

5. The receiver according to claim 1, wherein the first and second signals are transmitted with respective first and second, mutually orthogonal polarizations, and wherein the interference cancellation circuit is operative to reduce cross-polarization interference coupled from the second signal to the first signal.

6. The receiver according to claim 1, wherein the phase rotator comprises a phase-locked loop (PLL) and wherein the at least one configuration parameter comprises at least one of a loop bandwidth and a loop gain of the PLL.

7. The receiver according to claim 1, wherein the control module is operative to calculate the variable phase shift using at least one of a pilot-based and a batch-based phase estimation method.

8. The receiver according to claim 1, wherein the interference comprises a level of a crosscoupling between the first and second signals.

9. The receiver according to claim 8, wherein the first and second coefficients are determined adaptively in response to conditions on a communication channel over which the first and second signals are received, and wherein the control module is operative to estimate the level of the crosscoupling by performing a calculation based on at least some of the first and second coefficients.

10. The receiver according to claim 1, wherein the control module is operative to store two or more predefined control sets of the at least one configuration parameter, to evaluate a metric function responsively to the estimated interference, to choose a selected control set out of the two or more predefined control sets responsively to the evaluated metric function, and to load the chosen control set into the phase rotator.

11. The receiver according to claim 1, wherein the control module is operative to adaptively calculate the at least one configuration parameter responsively to the estimated interference.

12. The receiver according to claim 1, wherein the second signal contains distortion due to the first signal, and wherein the interference cancellation circuit is further operative to produce responsively to the first and second streams of input samples a fourth stream of output samples representative of the second signal and having a reduced level of the distortion.

13. A wireless communication system, comprising:
   a transmitter, which is operative to transmit first and second signals over the air; and
   a receiver, which comprises:
      an input circuit, which is coupled to at least one antenna so as to receive, process and digitize the first and second signals, thus generating first and second streams of input samples; and
      an interference cancellation circuit, comprising:
         first and second adaptive filters, which are respectively coupled to filter the first and second streams of input samples using respective first and second coefficients to generate respective first and second filter outputs;
         a phase rotator, which is adapted to apply a variable phase shift between the first and second signals, the phase rotator having at least one configuration parameter; and
         a control module, which is operative to compute the variable phase shift and to provide the variable phase shift to the phase rotator so as to compensate for a phase deviation between the first and second signals, to estimate interference in the first signal due to the second signal, and to set the at least one configuration parameter of the phase rotator responsively to the estimated interference.

14. The system according to claim 13, wherein the interference cancellation circuit is operative to produce responsively to the first and second streams of input samples a third stream of output samples representative of the first signal and having a reduced level of the interference.

15. The system according to claim 14, wherein the control module is operative to identify an increase of a level of the interference and to set the at least one configuration parameter responsively to the identified increase.

16. The system according to claim 15, wherein the phase rotator comprises a phase-locked loop (PLL), wherein the at least one configuration parameter comprises a frequency setting of the PLL, and wherein the control module is operative, subsequent to identifying the increase of the level of the interference, to search over a predefined range of frequency settings for a best frequency setting determined responsively to the estimated interference, and to load the best frequency setting to the PLL.

17. The system according to claim 13, wherein the first and second signals are transmitted with respective first and second, mutually orthogonal polarizations, and wherein the interference cancellation circuit is operative to reduce cross-polarization interference coupled from the second signal to the first signal.

18. The system according to claim 13, wherein the phase rotator comprises a phase-locked loop (PLL) and wherein the at least one configuration parameter comprises at least one of a loop bandwidth and a loop gain of the PLL.

19. The system according to claim 13, wherein the control module is operative to calculate the variable phase shift using at least one of a pilot-based and a batchbased phase estimation method.

20. The system according to claim 13, wherein the interference comprises a level of a cross-coupling between the first and second signals.

21. The system according to claim 20, wherein the first and second coefficients are determined adaptively in response to conditions on a communication channel over which the first and second signals are received, and wherein the control module is operative to estimate the level of the cross-coupling by performing a calculation based on at least some of the first and second coefficients.

22. The system according to claim 13, wherein the control module is operative to store two or more predefined control sets of the at least one configuration parameter, to evaluate a metric function responsively to the estimated interference, to choose a selected control set out of the two or more predefined control sets responsively to the evaluated metric function, and to load the chosen control set into the phase rotator.

23. The system according to claim 13, wherein the control module is operative to adaptively calculate the at least one configuration parameter responsively to the estimated interference.

24. The system according to claim 13, wherein the second signal contains distortion due to the first signal, and wherein the interference cancellation circuit is further operative to produce responsively to the first and second streams of input samples a fourth stream of output samples representative of the second signal and having a reduced level of the distortion.

25. An interference cancellation circuit for processing first and second streams of input samples representing respective first and second signals, the circuit comprising:
   first and second adaptive filters, which are respectively coupled to filter the first and second streams of input samples using respective first and second coefficients to generate respective first and second filter outputs;
   a phase rotator, which is adapted to apply a variable phase shift between the first and second signals, the phase rotator having at least one configuration parameter; and
   a control module, which is operative to compute the variable phase shift and to provide the variable phase shift to the phase rotator so as to compensate for a phase deviation between the first and second signals, to estimate interference in the first signal due to the second signal, and to set the at least one configuration parameter of the phase rotator responsively to the estimated interference.

26. The circuit according to claim 25, wherein the circuit is operative to produce responsively to the first and second streams of input samples a third stream of output samples representative of the first signal and having a reduced level of the interference.

27. The circuit according to claim 26, wherein the control module is operative to identify an increase of a level of the interference and to set the at least one configuration parameter responsively to the identified increase.

28. The circuit according to claim 27, wherein the phase rotator comprises a phase-locked loop (PLL), wherein the at least one configuration parameter comprises a frequency setting of the PLL, and wherein the control module is operative, subsequent to identifying the increase of the level of the interference, to search over a predefined range of frequency settings for a best frequency setting determined responsively to the estimated interference, and to load the best frequency setting to the PLL.

29. The circuit according to claim 25, wherein the first and second signals are transmitted with respective first and second, mutually orthogonal polarizations, and wherein the circuit is operative to reduce cross-polarization interference coupled from the second signal to the first signal.

30. The circuit according to claim 25, wherein the phase rotator comprises a phase-locked loop (PLL) and wherein the at least one configuration parameter comprises at least one of a loop bandwidth and a loop gain of the PLL.

31. The circuit according to claim 25, wherein the control module is operative to calculate the variable phase shift using at least one of a pilot-based and a batch-based phase estimation method.

32. The circuit according to claim 25, wherein the interference comprises a level of a cross-coupling between the first and second signals.

33. The circuit according to claim 32, wherein the first and second coefficients are determined adaptively in response to conditions on a communication channel over which the first and second signals are received, and wherein the control module is operative to estimate the level of the crosscoupling by performing a calculation based on at least some of the first and second coefficients.

34. The circuit according to claim 25, wherein the control module is operative to store two or more predefined control sets of the at least one configuration parameter, to evaluate a metric function responsively to the estimated interference, to choose a selected control set out of the two or more predefined control sets responsively to the evaluated metric function, and to load the chosen control set into the phase rotator.

35. The circuit according to claim 25, wherein the control module is operative to adaptively calculate the at least one configuration parameter responsively to the estimated interference.

36. The circuit according to claim 25, wherein the second signal contains distortion due to the first signal, and wherein the circuit is further operative to produce responsively to the first and second streams of input samples a fourth stream of output samples representative of the second signal and having a reduced level of the distortion.

37. A method for wireless communications, comprising:
   receiving, processing and digitizing first and second signals transmitted over the air so as to generate first and second streams of input samples;
   filtering the first and second streams of input samples using respective first and second coefficients to generate respective first and second filtered outputs;
   applying a variable phase shift to one of the first and second filtered outputs using a phase rotator having at least one configuration parameter so as to generate a phase-shifted output compensating for a phase deviation between the first and second signals;
   summing the first and second filtered outputs so as to generate a third stream of output samples, which is representative of the first signal;
   estimating interference in the first signal due to the second signal; and
   setting the at least one configuration parameter of the phase rotator responsively to the estimated interference.

38. The method according to claim 37, wherein summing the first and second filtered outputs comprises reducing the interference due to the second signal in the third stream of output samples.

39. The method according to claim 38, wherein setting the at least one configuration parameter comprises identifying an increase of a level of the interference, and setting the at least one configuration parameter responsively to the identified increase.

40. The method according to claim 39, wherein the phase rotator comprises a phase-locked loop (PLL), wherein the at least one configuration parameter comprises a frequency setting of the PLL, and wherein setting the at least one configuration parameter comprises, subsequent to identifying the increase of the level of the interference, searching over a predefined range of frequency settings for a best frequency setting determined responsively to the estimated interference, and loading the best frequency setting to the PLL.

41. The method according to claim 37, wherein receiving the first and second signals comprises receiving the signals transmitted with respective first and second, mutually orthogonal polarizations, and wherein summing the first filtered output with the phase-shifted output comprises reducing cross-polarization interference coupled from the second signal to the first signal.

42. The method according to claim 37, wherein the phase rotator comprises a phase-locked loop (PLL) and wherein setting the at least one configuration parameter comprises setting at least one of a loop bandwidth and a loop gain of the PLL.

43. The method according to claim 37, wherein applying the variable phase shift comprises calculating the variable phase shift using at least one of a pilot based and a batch-based phase estimation method.

44. The method according to claim 37, wherein estimating the interference comprises estimating a level of a cross-coupling between the first and second signals.

45. The method according to claim 44, wherein the first and second coefficients are determined adaptively in response to conditions on a communication channel over which the first and second signals are received, and wherein estimating the level of the cross-coupling comprises performing a calculation based on at least some of the first and second coefficients.

46. The method according to claim 37, wherein setting the at least one configuration parameter comprises:
    storing two or more predefined control sets of the at least one configuration parameter;
    evaluating a metric function responsively to the estimated interference;
    choosing a selected control set out of the two or more predefined control sets responsively to the evaluated metric function; and
    loading the chosen control set into the phase rotator.

47. The method according to claim 37, wherein setting the at least one configuration parameter comprises adaptively calculating the at least one configuration parameter responsively to the estimated interference.

* * * * *